United States Patent
Kuroyanagi et al.

(10) Patent No.: US 6,421,367 B1
(45) Date of Patent: Jul. 16, 2002

(54) TWO-PHASE/FOUR-PHASE MODULATED COMB-SHAPED SPREAD SPECTRUM COMMUNICATION SYSTEM

(75) Inventors: Noriyoshi Kuroyanagi, 3-44-14, Sakuragaoka, Higashiyamato-shi, Tokyo 207; Naoki Suehiro, 3-18-14, Azuma, Tsukuba-shi, Ibaraki 305; Toshikatsu Naitoh, Kanagawa, all of (JP)

(73) Assignees: Noriyoshi Kuroyanagi, Tokyo; Naoki Suehiro, Ibaraki; Toyo Communication Equipment Co., Ltd., Kanagawa, all of (JP)

( * ) Notice: Subject to any disclaimer, the term of this patent is extended or adjusted under 35 U.S.C. 154(b) by 0 days.

(21) Appl. No.: 09/077,221
(22) PCT Filed: Sep. 17, 1997
(86) PCT No.: PCT/JP97/03272
§ 371 (c)(1), (2), (4) Date: Sep. 25, 1998
(87) PCT Pub. No.: WO98/12831
PCT Pub. Date: Mar. 26, 1998

(30) Foreign Application Priority Data

Sep. 20, 1996 (JP) .............................................. 8-271858

(51) Int. Cl.$^7$ .............................................. H04L 27/30
(52) U.S. Cl. ...................................... 375/130; 375/152
(58) Field of Search ................................ 375/130, 135, 375/136, 146, 147, 152, 150, 219; 370/342, 335, 320

(56) References Cited

PUBLICATIONS

Kamata et al. "Signal Design for Approximately Synchronized CDMA Systems Without Co–Channel Interference (or Code for Approximate Synchronizationn CDMA With No Channel–to–Channel Interference)" Oct. 30, 1996; Pertinent pp. 13–18.

Suehiro et al. "Quadriphase M–ary Signal Design for Approximately Synchronized CDMA Systems Without Co–Channel Interference (or Four–Phase M–ary Code for Approximate Synchronization Cellular CDMA)" Jun. 19, 1997; Pertinent pp. 73–80.

*Primary Examiner*—Chi Pham
*Assistant Examiner*—Khai Tran
(74) *Attorney, Agent, or Firm*—Koda & Androlia

(57) ABSTRACT

When communications are performed between a transmitter 2 and a receiver 3 via a transmission path 4, the transmitter prepares a basic sequence consisting of two-phase or four-phase tips, and transmits an expanded transmission frame which is constructed by repeatedly arranging one or a plurality of the basic sequence so as to obtain a finite length periodic sequence with a comb-form spectrum and by adding the replica of one or a plurality of tips of a back portion and front portion of the finite length periodic sequence to the outside of the front portion and the outside of the back portion of the finite length periodic sequence; and the receiver demodulates the expanded transmission frame using a matched filter which is matched with the finite length periodic sequence which is the central part of the expanded transmission frame, that is not including the added tips. In other words, the present invention can simplify the construction of communication equipment by using two-phase signals or four-phase signals.

4 Claims, 4 Drawing Sheets

(a) BAND OF SIGNAL $S_1$ (SPECTRUM)

(b) WAVEFORM OF SIGNAL $S_1$

US 6,421,367 B1

TWO-PHASE/FOUR-PHASE MODULATED COMB-SHAPED SPREAD SPECTRUM COMMUNICATION SYSTEM

TECHNICAL FIELD

The present invention relates to a two-phase/four-phase modulated spread spectrum communication system with a comb-form spectrum which is designed so as to reduce co-channel interference.

BACKGROUND ART

The present applicant has announced an approximately synchronized CDMA system that uses signals consisting of pseudo-periodic sequences as a signal design method which makes it possible to avoid no co-channel interference.

In this signal design method, interference between desired and undesired channels can be eliminated; as a result, the signal of a desired channel can be efficiently separated from the other undesired channels. However, in conventional approximately synchronized CDMA systems, signals are designed by using multi-phase sequences; consequently, the signals on respective channels are not two-phase signals (which are signals expressed by +, −) or four-phase signals (which are signals expressed by +, −, j, −j), and therefore, they should be made of much more complicated communication equipment.

The present invention was devised in light of the above facts; and in claim 1, the object of the present invention is to provide a two-phase/four-phase modulated spread spectrum communication system with a comb-form spectrum which makes it possible to simplify the construction of a communication equipment by means of two-phase signals or four-phase signals.

Furthermore, in claim 2, the object of the present invention is to provide a two-phase/four-phase modulated spread spectrum communication system with a comb-form spectrum which makes it possible to assign different carrier waves to respective users by means of two-phase signals or four-phase signals.

Furthermore, in claim 3, the object of the present invention is to provide a two-phase/four-phase modulated spread spectrum communication system with a comb-form spectrum which makes it possible, using two-phase signals or four-phase signals, to prevent the generation of side lobes in the vicinity of the main pulses in signals produced from the matched filter on the reception side.

Furthermore, in claim 4, the object of the present invention is to provide a two-phase/four-phase modulated spread spectrum communication system with a comb-form spectrum which makes it possible to create a plurality of code words by the use of two-phase signals or four-phase signals.

DISCLOSURE OF INVENTION

In order to accomplish the above-described objects, in claim 1, the two-phase/four-phase modulated spread spectrum communication system with a comb-form spectrum of the present invention is characterized by the fact that a basic sequence consisting of two-phase or four-phase chips is prepared, and an extended transmission frame is constructed by repeating one or a plurality of the basic sequence so as to obtain a periodic sequence of finite length with a comb-form spectrum and by duplicating and adding one or a plurality of chips of the back portion and front portion of the periodic sequence of finite length to the outside of the front portion and outside of the back portion of the periodic sequence of finite length; and on the reception side the extended transmission frame is demodulated using a matched filter which is matched with the periodic sequence of finite length prior to extension.

Furthermore, in claim 2, the present invention is characterized by the fact that in the two-phase/four-phase modulated spread spectrum communication system with a comb-form modulated spectrum claimed in claim 1, different carrier waves are assigned to respective users, and two-phase signals or four-phase signals with a comb-form modulated spectrum are assigned to the respective carrier waves thus assigned.

In addition, in claim 3, the present invention is characterized by the fact that in the two-phase/four-phase modulated spread spectrum communication system with a comb-form modulated spectrum claimed in claim 1 or 2, the basic sequence is formed as a two-phase or four-phase orthogonal sequence or as a multi-phase orthogonal sequence, and side lobes are prevented from being generated in the vicinity of the main pulses produced from the matched filter on the reception side, thus reinforcing the anti-multi-path characteristics.

Furthermore, in claim 4, the present invention is characterized by the fact that in the two-phase/four-phase modulated spread spectrum communication system with a comb-form modulated spectrum claimed in claim 1, a plurality of different types of the extended transmission frame are prepared so as to be used as code words.

BRIEF DESCRIPTION OF DRAWINGS

The above-mentioned features and objects of the present invention will become more apparent with reference to the following description taken together with the accompanying drawings wherein like reference numerals denote like elements and in which.

BEST MODE FOR CARRYING OUT THE INVENTION

Figure 1:
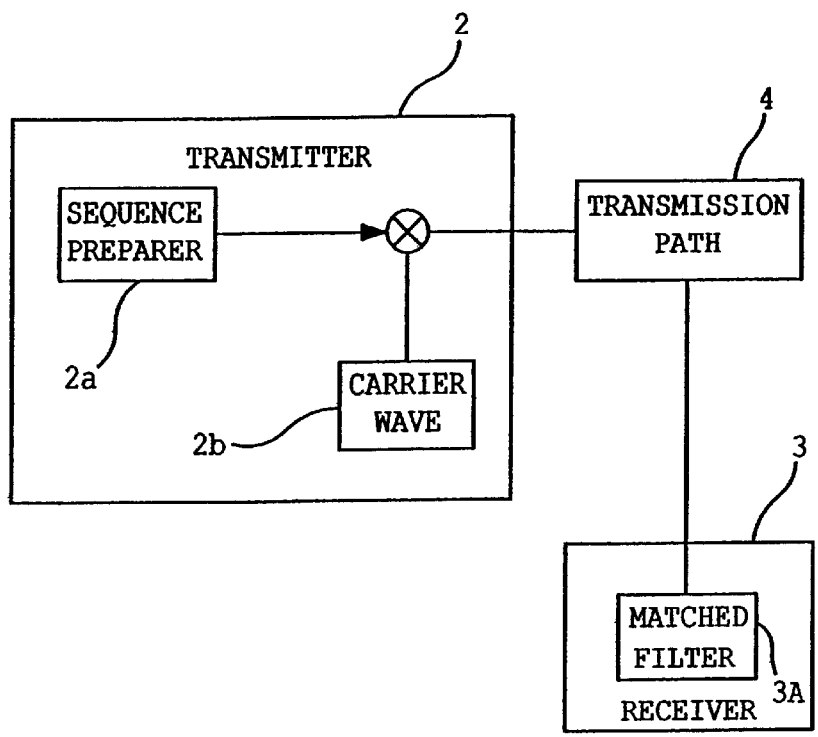
FIG. 1 is a block diagram which illustrates a communication system using one embodiment of the two-phase/four-phase modulated spread spectrum communication system with a comb-form spectrum provided by the present invention.

First, prior to describing the details of the approximately synchronized CDMA system of the present invention, the basic technology of the two-phase/four-phase modulated spread spectrum communication system with a comb-form spectrum will be described.

<<Preface>>

First, in regards to a signal design method for an approximately synchronized CDMA system which can be realized without co-channel interference, the present inventors have published a publication "N. Suehiro, 'Approximately synchronized CDMA system without co-channel interference using pseudo-periodic sequences', Proceedings of International Symposium on Personal Communications '93— Nanjing, October 1993", a publication "N. Suehiro, 'A signal design without co-channel interference for approximately synchronized CDMA systems', IEEE Journal of Selected Areas in Communications, June 1994", and a publication "N. Suehiro, 'Signal design for approximately synchronized CDMA systems without co-channel interference', Proceedings of ISSSTA94, July 1994".

Furthermore, in regard to a code sequence design method which realizes an excellent data communication capacity in CDMA systems including approximately synchronized CDMA systems, the present inventors have published a publication "N. Suehiro, 'Signal design for CDAM by coded addition of sequences', Technical Report of IEEE, Vol. IT-, May 1994", a publication "N. Suehiro, 'Signal design for approximately synchronized CDMA systems without co-channel interference', Proceedings of ISSSTA94, July 1994", and a publication "N. Suehiro, 'New signal design method by coded addition of sequences', Proceedings of ISIT, September 1995".

The signals used in these respective publications possess such an extremely important special feature that in cases where a multi-phase orthogonal sequence is used as the basic orthogonal sequence prepared for carrying data information, then when a receiver detects it with a matched filter, no side lobe is generated in a small time difference range of the matched filter output. This special feature will be described in detail below.

First, in terms of the structure of an equipment, a two-phase signal or four-phase signal is more useful than a multi-phase signal; accordingly, the design method of a two-phase signal or four-phase signal for use in an approximately synchronized CDMA system will be described in which features of no side lobes in detection and no co-channel interference and, excellent data communication capacity will be explained.

In the theory of signal design methods already proposed, a two-phase or four-phase sequence is used as a means of carrying information in each set which consists of a transmitter and receiver (generally a base station). In this case, co-channel interference appears as a multi-phase sequence as far as the carrier means on the receiver is concerned. In addition, such a co-channel interference does not affect the sensitivity on the receiver. However, the co-channel interference signal becomes a two-phase signal or four-phase signal as far as the transmitter carrier means is concerned.

<<Signal Design Method for Approximately Synchronized CDMA Systems Without Co-Channel Interference>>

<Pseudo-Periodic Sequences>

First, prior to a detailed description which will be presented below, the concept of a pseudo-periodic sequence will be outlined.

The correlation characteristics of a period sequence are more easily designed than those of a sequence of finite length.

Here, $A = (a_0, a_1, \ldots, a_{N-1})$ is taken as a sequence of finite length with a length of N which is designed so that this sequence has favorable periodic correlation characteristics, and $A' = (a_{N-L_1}, \ldots, a_{N-1}, a_0, \ldots, a_{N-1}, a_0, \ldots, a_{L_2-1})$ is taken as an extended sequence of finite length with a length of $N+L_1+L_2$ whose central portion, a portion of length N, coincides with the finite length sequence A.

In this case, the elements of the front-end portion of the finite length sequence A' with a length of $L_1$ coincide with the elements of the back-end portion of the finite length sequence A with a length of $L_1$. Meanwhile, the elements of the back-end portion of the finite length sequence A' with a length of $L_2$ coincide with the elements of the front-end portion of the finite length sequence A with a length of $L_2$. Accordingly, the extended finite length sequence A' constitutes a finite length sequence which has a pseudo-period of N.

In a case where the finite length sequence A' is applied into a filter which is matched with the finite length sequence A, the output signal with length $2N+L_1+L_2-1$ that is produced from this filter corresponds to the correlation function of the finite length sequence A' and the finite length sequence A. In addition, the central portion of the output signal with a length of $L_1+L_2+1$ also coincides with the portion extending from the $-L_1$ shift component to the $L_2$ shift component of the auto correlation function of the periodic sequence " . . . AAA . . . ".

Furthermore, in a case where B is a sequence with a finite length of N which differs from that of A, and the finite length sequence A' is applied to a filter which is matched with this finite length sequence B, as in the case described above, the central portion of the output signal with a length of $L_1+L_2+1$ is produced from the filter coincides with the portion extending from the $-L_1$ shift component to the $L_2$ shift component of the cross correlation function between the two periodic sequences " . . . AAA . . . " and " . . . BBB . . . ".

Here, the finite length sequence A' is referred to as a pseudo-periodic sequence with a length of $N+L_1+L_2$.

<Design of Periodic Sequences Which Do Not Have Correlation>

The present inventors have proposed a method for setting, periodic sequences which do not have correlation. Here, this design method will again be explained. First, let A and B be cyclic matrices, each of which represents a periodic sequence, then these matrices A and B are related to diagonal matrices C and D as indicated by the following equations:

$A = F^{-1}CF$ $B = F^{-1}DF$

Here, F indicates a DFT (Discrete Fourier transform) matrix.

The correlation function between the periodic sequences expressed by the cyclic matrices A and B can be expressed by the following equation:

Numerical formula 1

$$A \, ^t\overline{B} = F^{-1}C\overline{D}F \quad (1)$$

Here, $\overline{B}$ and $\overline{D}$ are respective complex conjugates of B and D, and $^t\overline{B}$ is a transposed matrix of $\overline{B}$. Furthermore, in a case where all of the diagonal elements in the diagonal matrices on the right side of the above-described Equation (1), i. e., Numerical formula 2

Diagonal matrices C, $\overline{D}$ are zero, the cross correlation function between the cyclic matrices A and B is zero in all terms.

For example, since $(1, 1, W_3)$ is an orthogonal sequence, each of the column vectors on the right side of Equation (2)

is an orthogonal sequence. Transforming an orthogonal sequence with DFT makes a (multi-phase) sequence whose components have a certain absolute value. Accordingly, Numerical formula 3

$$F_{12}^{-1}\begin{bmatrix}1&0&0&0\\0&1&0&0\\0&0&1&0\\0&0&0&1\\1&0&0&0\\0&1&0&0\\0&0&1&0\\0&0&0&1\\W_3&0&0&0\\0&W_3&0&0\\0&0&W_3&0\\0&0&0&W_3\end{bmatrix}=\frac{1}{2}\begin{bmatrix}W_{12}^1&W_{12}^1&W_{12}^1&W_{12}^1\\W_{12}^1&W_{12}^2&W_{12}^3&W_{12}^4\\W_{12}^9&W_{12}^{11}&W_{12}^1&W_{12}^3\\W_{12}^1&W_{12}^4&W_{12}^7&W_{12}^{10}\\W_{12}^1&W_{12}^5&W_{12}^9&W_{12}^1\\W_{12}^9&W_{12}^2&W_{12}^7&W_{12}^0\\W_{12}^1&W_{12}^7&W_{12}^1&W_{12}^7\\W_{12}^1&W_{12}^8&W_{12}^3&W_{12}^{10}\\W_{12}^9&W_{12}^5&W_{12}^1&W_{12}^9\\W_{12}^1&W_{12}^{10}&W_{12}^7&W_{12}^4\\W_{12}^1&W_{12}^{11}&W_{12}^9&W_{12}^7\\W_{12}^9&W_{12}^6&W_{12}^7&W_{12}^6\end{bmatrix}\quad(2)$$

Here, $$W_N = \exp\left(\frac{2\pi\sqrt{-1}}{N}\right)$$

F: 12-point DFT matrix.

Four multi-phase periodic sequences can be obtained by using the columns of the right-side matrix of the above Equation (2). All of the terms of the cross-correlation functions between any pair of these four multi-phase periodic sequences become zero; accordingly, the results of multiplying the corresponding terms in these spectra take zero in all terms.

<<Design of Set of Periodic Sequences Which Do Not Have Cross-Correlation or Auto Correlation Side Lobes in the Case of Very Small Shifts>>

Furthermore, since $(1, 1, W_3)$ is an orthogonal sequence, each of the four columns in the left-side matrix of Equation (2) is an orthogonal sequence.

The auto correlation functions of these four-phase periodic sequences are as follows:

Numerical formula 4

(1, 0, 0, 1, 0, 0, 1, 0, 0, 1, 0, 0)

(1, 0, 0, j, 0, 0, −1, 0, 0, −j, 0, 0)

(1, 0, 0, −1, 0, 0, 1, 0, 0, −1, 0, 0)

(1, 0, 0, −j, 0, 0, −1, 0, 0, j, 0, 0)

Here, $j=\sqrt{-1}$

Furthermore, when they are used as pseudo-periodic signals, these auto correlation functions have useful characteristics for separating received signal and multi-path noise.

This point will be described in detail below. First, let $(a_0, a_1, a_2)$ be a multi-phase sequence with a period of 3, and $(c_0, c_1, c_2)$ be an orthogonal sequence with a period of 3, then Numerical formula 5

$$F_3\begin{bmatrix}a_0\\a_1\\a_2\end{bmatrix}=\begin{bmatrix}c_0\\c_1\\c_2\end{bmatrix}$$

is obtained. And the following two equations,

Numerical formula 6

$$\sqrt{2}\,F_6^{-1}\begin{bmatrix}c_0\\0\\c_1\\0\\c_2\\0\end{bmatrix}=\begin{bmatrix}a_0\\a_1\\a_2\\a_0\\a_1\\a_2\end{bmatrix}\quad\text{and}$$

Numerical formula 7

$$\sqrt{2}\,F_6^{-1}\begin{bmatrix}0\\c_0\\0\\c_1\\0\\c_2\end{bmatrix}=\begin{bmatrix}w_6^0 a_0\\w_6^1 a_1\\w_6^2 a_2\\w_6^3 a_0\\w_6^4 a_1\\w_6^5 a_2\end{bmatrix}$$

are compared, then, in a case where the auto correlation function of $(a_0, a_1, a_2, a_0, a_1, a_2)$ is expressed as Numerical formula 8

$$F_6^{-1}\begin{bmatrix}c_0\overline{c_0}\\0\\c_1\overline{c_1}\\0\\c_2\overline{c_2}\\0\end{bmatrix}=\begin{bmatrix}e_0\\e_1\\e_2\\e_0\\e_1\\e_2\end{bmatrix}$$

it can be seen that the auto correlation function of $$(w_6^0 a_0,\ w_6^1 a_1,\ w_6^2 a_2,\ w_6^3 a_0,\ w_6^4 a_1, w_6^5 a_2)$$

is as follows

Numerical formula 9

$$F_6^{-1}\begin{bmatrix}0\\c_0\overline{c_0}\\0\\c_1\overline{c_1}\\0\\c_2\overline{c_2}\end{bmatrix}=\begin{bmatrix}w_6^0 e_0\\w_6^1 e_1\\w_6^2 e_2\\w_6^3 e_0\\w_6^4 e_1\\w_6^5 e_2\end{bmatrix}$$

Here, if $e_1=e_2=0$, then

Numerical formula 10

$$\begin{bmatrix}c_0\overline{c_0}\\0\\c_1\overline{c_1}\\0\\c_2\overline{c_2}\\0\end{bmatrix}=F_6\begin{bmatrix}e_0\\0\\0\\e_0\\0\\0\end{bmatrix}=\frac{1}{\sqrt{6}}\begin{bmatrix}2e_0\\0\\2e_0\\0\\2e_0\\0\end{bmatrix}\quad\text{and}$$

-continued

Numerical formula 11

$$\begin{bmatrix} 0 \\ c_0\overline{c_0} \\ 0 \\ c_1\overline{c_1} \\ 0 \\ c_2\overline{c_2} \end{bmatrix} = F_6 \begin{bmatrix} e_0 \\ 0 \\ 0 \\ -e_0 \\ 0 \\ 0 \end{bmatrix} = \frac{1}{\sqrt{6}} \begin{bmatrix} 0 \\ 2e_0 \\ 0 \\ 2e_0 \\ 0 \\ 2e_0 \end{bmatrix}$$

Consequently, it is evident that when $e_1 = e_2 = 0$,
$|c_0| = |c_1| = |c_2|$
This means that when
$(c_0, c_1, c_2)$
is a multi-phase orthogonal sequence, the auto correlation function of
$(a_0, a_1, a_2, a_0, a_1, a_2)$
and the auto correlation function of
$(w_6^0 a_0, w_6^1 a_1, w_6^2 a_2, w_6^3 a_0, w_6^5 a_1, w_6^5 a_2)$
have no side lobes at the shifts of $-2, -1, 1$ or $2$.

This conclusion can easily be generalized.

<<Approximately Synchronized CDMA System Which Has No Side Lobes in Detection or Co-Channel Interference>>

Furthermore, since $(1, 1, W_3)$ is a multi-phase orthogonal sequence in Equation (2), the pseudo-periodic sequence $A_i'$ has no side lobes at the shifts of $-2, -1, 1$ or $2$ in a case where $(1, 1, W_3)$ is applied to a matched filter matched to $A_i$ ($i=1, 2, 3$ or $4$). Here, the column vectors on the right side of Equation (2) are taken as A1, A2, A3 and A4.

Furthermore, in a case where another pseudo-periodic sequence $A_j'$ with a length of $12+2L$ and a pseudo-period of 12 is applied to a matched filter matched to $A_i$, the output signal produced from the filter becomes zero from the $-L$ shift period to the L shift period. Accordingly, an approximately synchronized state which is such that the difference between the signal and the interference is within the range extending from $-L$ to $L$ is produced, so that a CDMA communication system which has no side lobes in detection and no co-channel interference can be realized in the shift ranging from $-L$ to $L$.

<<Two-Phase or Four-Phase Signal Design Method for Approximately Synchronized CDMA System with No Side Lobes in Detection or Co-Channel Interference>>

By using a DFT matrix, it is possible to convert an orthogonal sequence into a multi-phase periodic sequence; and by using the above-described DFT matrix, it is possible to convert a multi-phase periodic sequence into an orthogonal sequence.

Accordingly, by using the DFT matrix, it is possible to convert one multi-phase orthogonal sequence into another multi-phase orthogonal sequence.

Here, since $(1, j)$ is an orthogonal sequence, H1 shown in the following equation is a cyclic type unitary matrix.

Numerical formula 12

$$H_1 = \frac{1}{\sqrt{2}} \begin{bmatrix} 1 & j \\ j & 1 \end{bmatrix}$$

Likewise, the eight columns in the respective matrices shown below constitute a super-regular polyhedron in Euclidean space.

Numerical formula 13

$$\sqrt{2} H_1 = \begin{bmatrix} 1 & j \\ j & 1 \end{bmatrix}$$

$$j\sqrt{2} H_1 = \begin{bmatrix} j & -1 \\ -1 & j \end{bmatrix}$$

$$-\sqrt{2} H_1 = \begin{bmatrix} -1 & -j \\ -j & -1 \end{bmatrix}$$

$$-j\sqrt{2} H_1 = \begin{bmatrix} -j & 1 \\ 1 & -j \end{bmatrix}$$

Here, since the respective columns in

Numerical formula 14

$$\sqrt{2} F_2 H_1 = \begin{bmatrix} w_8^1 & w_8^1 \\ w_8^7 & w_8^3 \end{bmatrix}$$

$$j\sqrt{2} F_2 H_1 = \begin{bmatrix} w_8^3 & w_8^3 \\ w_8^1 & w_8^5 \end{bmatrix}$$

$$-\sqrt{2} F_2 H_1 = \begin{bmatrix} w_8^5 & w_8^5 \\ w_8^3 & w_8^7 \end{bmatrix}$$

$$-j\sqrt{2} F_2 H_1 = \begin{bmatrix} w_8^7 & w_8^7 \\ w_8^5 & w_8^1 \end{bmatrix}$$

are orthogonal sequences, eight four-phase code words including a super-regular polyhedron in signal space can be prepared for respective users as shown in the following equations:

Numerical formula 15

$$\sqrt{3} F_6^{-1} \begin{bmatrix} w_8^1 & w_8^1 & w_8^3 & w_8^3 & w_8^5 & w_8^5 & w_8^7 & w_8^7 \\ 0 & 0 & 0 & 0 & 0 & 0 & 0 & 0 \\ 0 & 0 & 0 & 0 & 0 & 0 & 0 & 0 \\ w_8^7 & w_8^3 & w_8^1 & w_8^5 & w_8^3 & w_8^7 & w_8^5 & w_8^1 \\ 0 & 0 & 0 & 0 & 0 & 0 & 0 & 0 \\ 0 & 0 & 0 & 0 & 0 & 0 & 0 & 0 \end{bmatrix} = \begin{bmatrix} 1 & j & j & -1 & -1 & -j & -j & 1 \\ j & 1 & -1 & j & -j & -1 & 1 & -j \\ 1 & j & j & -1 & -1 & -j & -j & 1 \\ j & 1 & -1 & j & -j & -1 & 1 & -j \\ 1 & j & j & -1 & -1 & -j & -j & -1 \\ j & 1 & -1 & j & -j & -1 & 1 & -j \end{bmatrix}$$

$$= [y_{00} \; y_{01} \; y_{02} \; y_{03} \; y_{04} \; y_{05} \; y_{06} \; y_{07}]$$

Numerical formula 16

$$\sqrt{3} F_6^{-1} \begin{bmatrix} 0 & 0 & 0 & 0 & 0 & 0 & 0 & 0 \\ w_8^1 & w_8^1 & w_8^3 & w_8^3 & w_8^5 & w_8^5 & w_8^7 & w_8^7 \\ 0 & 0 & 0 & 0 & 0 & 0 & 0 & 0 \\ 0 & 0 & 0 & 0 & 0 & 0 & 0 & 0 \\ w_8^7 & w_8^3 & w_8^1 & w_8^5 & w_8^3 & w_8^7 & w_8^5 & w_8^1 \\ 0 & 0 & 0 & 0 & 0 & 0 & 0 & 0 \end{bmatrix} = \begin{bmatrix} w_{24}^0 & 0 & 0 & 0 & 0 & 0 \\ 0 & w_{24}^4 & 0 & 0 & 0 & 0 \\ 0 & 0 & w_{24}^8 & 0 & 0 & 0 \\ 0 & 0 & 0 & w_{24}^{12} & 0 & 0 \\ 0 & 0 & 0 & 0 & w_{24}^{16} & 0 \\ 0 & 0 & 0 & 0 & 0 & w_{24}^{20} \end{bmatrix}$$

$$\begin{bmatrix} 1 & j & j & -1 & -1 & -j & -j & 1 \\ j & 1 & -1 & j & -j & -1 & 1 & -j \\ 1 & j & j & -1 & -1 & -j & -j & 1 \\ j & 1 & -1 & j & -j & -1 & 1 & -j \\ 1 & j & j & -1 & -1 & -j & -j & -1 \\ j & 1 & -1 & j & -j & -1 & 1 & -j \end{bmatrix} = [y_{10} \quad y_{11} \quad y_{12} \quad y_{13} \quad y_{14} \quad y_{15} \quad y_{16} \quad y_{17}]$$

Numerical formula 17

$$\sqrt{3} F_6^{-1} \begin{bmatrix} 0 & 0 & 0 & 0 & 0 & 0 & 0 & 0 \\ 0 & 0 & 0 & 0 & 0 & 0 & 0 & 0 \\ w_8^1 & w_8^1 & w_8^3 & w_8^3 & w_8^5 & w_8^5 & w_8^7 & w_8^7 \\ 0 & 0 & 0 & 0 & 0 & 0 & 0 & 0 \\ 0 & 0 & 0 & 0 & 0 & 0 & 0 & 0 \\ w_8^7 & w_8^3 & w_8^1 & w_8^5 & w_8^3 & w_8^7 & w_8^5 & w_8^1 \end{bmatrix} = \begin{bmatrix} w_{24}^0 & 0 & 0 & 0 & 0 & 0 \\ 0 & w_{24}^8 & 0 & 0 & 0 & 0 \\ 0 & 0 & w_{24}^{16} & 0 & 0 & 0 \\ 0 & 0 & 0 & w_{24}^0 & 0 & 0 \\ 0 & 0 & 0 & 0 & w_{24}^8 & 0 \\ 0 & 0 & 0 & 0 & 0 & w_{24}^{16} \end{bmatrix}$$

$$\begin{bmatrix} 1 & j & j & -1 & -1 & -j & -j & 1 \\ j & 1 & -1 & j & -j & -1 & 1 & -j \\ 1 & j & j & -1 & -1 & -j & -j & 1 \\ j & 1 & -1 & j & -j & -1 & 1 & -j \\ 1 & j & j & -1 & -1 & -j & -j & 1 \\ j & 1 & -1 & j & -j & -1 & 1 & -j \end{bmatrix} = [y_{20} \quad y_{21} \quad y_{22} \quad y_{23} \quad y_{24} \quad y_{25} \quad y_{26} \quad y_{27}]$$

In this way, it can be seen that each pseudo-periodic signal set $[y_{i0}, y_{i1'}, \ldots, y_{i7'}]$ is a four-phase signal set its own carrier wave.

Meanwhile, in cases where the entire system is approximately synchronized, signals from undesired transmitters are received as multi-phase signals which do not produce any filter output at the receiver; accordingly, such signals do not produce co-channel interference.

Furthermore, in order to design four-phase signals, four-phase orthogonal sequences such as (1, 1, 1, -1), (1, j, 1, -j), (1, 1, 1, 1, 1, j, -1, -j, 1, -1, 1, -1, 1, -j, -1, j) or (1, 1, 1, 1, 1, j, -1, j, 1, -1, 1, -1, 1, j, -1, j), etc. can be used instead of (1, j).

Moreover, a two-phase orthogonal sequence (1, 1, 1, -1) can be used in order to set two-phase signals.

<<Design of Two-Phase or Four-Phase Signals for Approximately Synchronized CDMA System Which Does Not Have Co-Channel Interference, But Which Does Have Side Lobes in Detection>>

Furthermore, in cases where side lobes in detection are permitted, arbitrary two-phase or four-phase codes can be used.

If

Numerical formula 18

$$X_i = \begin{bmatrix} X_{i,o} \\ X_{i,o} \\ \vdots \\ X_{i,N-1} \end{bmatrix}$$

is taken as a code word in a two-phase or four-phase code of length N, then the orthogonal sequence $F_N x_i$ can be used as the basic orthogonal sequence in the above-described Equation (2).

In this way, each of the signals obtained is a two-phase or four-phase signal on its own carrier wave. In other words, any arbitrarily selected conventional codes can be used for the signal design described so far.

<<π/4 Rotation for Four-Phase Signals>>

Furthermore, by rotating four-phase signals by π/4 on the complex plane, balanced four-phase signals containing Numerical formula 19

$$\left( \frac{1+j}{\sqrt{2}}, \frac{-1+j}{\sqrt{2}}, \frac{-1-j}{\sqrt{2}}, \frac{1-j}{\sqrt{2}} \right)$$

can be obtained from unbalanced four-phase signals containing (1, j, −1, −j).

In some cases, the balanced four-phase signals may be more suitable than the unbalanced four-phase signals from the standpoint of the construction of the equipment. For example, since the real-number parts and imaginary-number parts of the balanced four-phase signals respectively consist of two values each, it may be possible to simplify the construction of the equipment depending on the approach used.

Hereafter, the two-phase/four-phase modulated spread spectrum communication system with a comb-form spectrum provided by the present invention, which uses the basic technique described above, will be described in detail with reference to the attached drawings.

FIG. 1 is a block diagram which illustrates one example of a communication system using one embodiment of the two-phase/four-phase modulated spread spectrum communication system with a comb-form spectrum provided by the present invention.

In the communication system 1 shown in this figure, when communication is to be performed between a transmitter 2 and a receiver 3 via a transmission path 4, a basic sequence consisting of two-phase or four-phase chips is prepared on the transmission side, and an extended transmission frame is constructed by repeatedly arranging the basic sequence so as to make a finite length periodic sequence, and adding one or a plurality of chips of the back portion and front portion of the finite length periodic sequence with a comb-form spectrum, to the outside of the front portion and the outside of the back portion of the finite length periodic sequence; and at the receiver, this extended transmission frame is demodulated with a matched filter matched to the finite length periodic sequence prior to extension. Furthermore, in this case, when two-phase signal or four-phase signals are transmitted and received using a carrier wave of a predetermined frequency, i.e., a carrier wave that has a frequency which the transmitter and receiver have themselves decided to use, even if users who transmit and receive other carrier waves should receive the two-phase signals or four-phase signals on such a carrier wave, these signals can be viewed by the users themselves as "multi-phase interference signals producing no co-channel interference under conditions of approximate synchronization" despite the fact that the signals on other carrier waves are two-phase signals or four-phase signals; accordingly, two-phase signals or four-phase signals on respective carrier waves can be assigned to respective users.

Hereafter, the carrier wave and the two-phase signals (or four-phase signals) used in the above communication system 1 will be described in detail.

Figure 2:
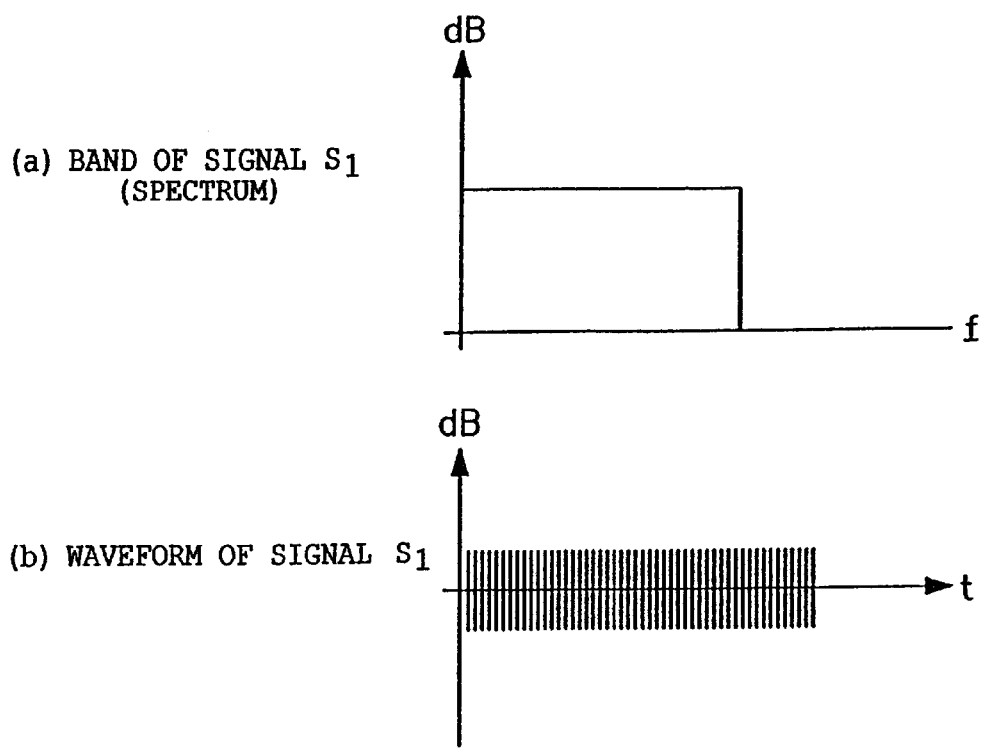
FIGS. 2(a) and 2(b) show examples of the spectrum and waveform of the basic signal used in the communication system shown in FIG. 1.
Figure 3:
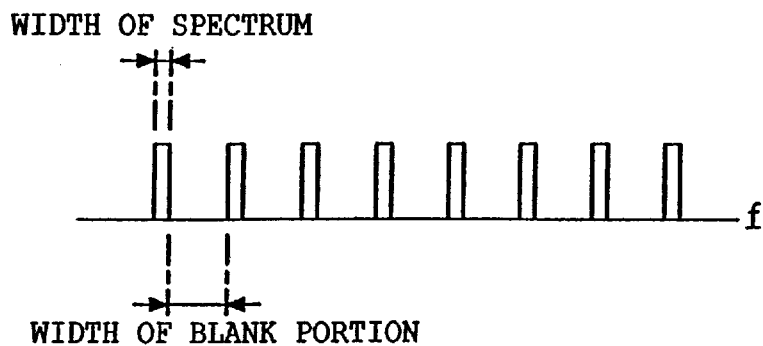
FIG. 3 shows an example of the spectrum of the signal obtained by repeating the signal shown in FIGS. 2(a) and 2(b)
Figure 4:
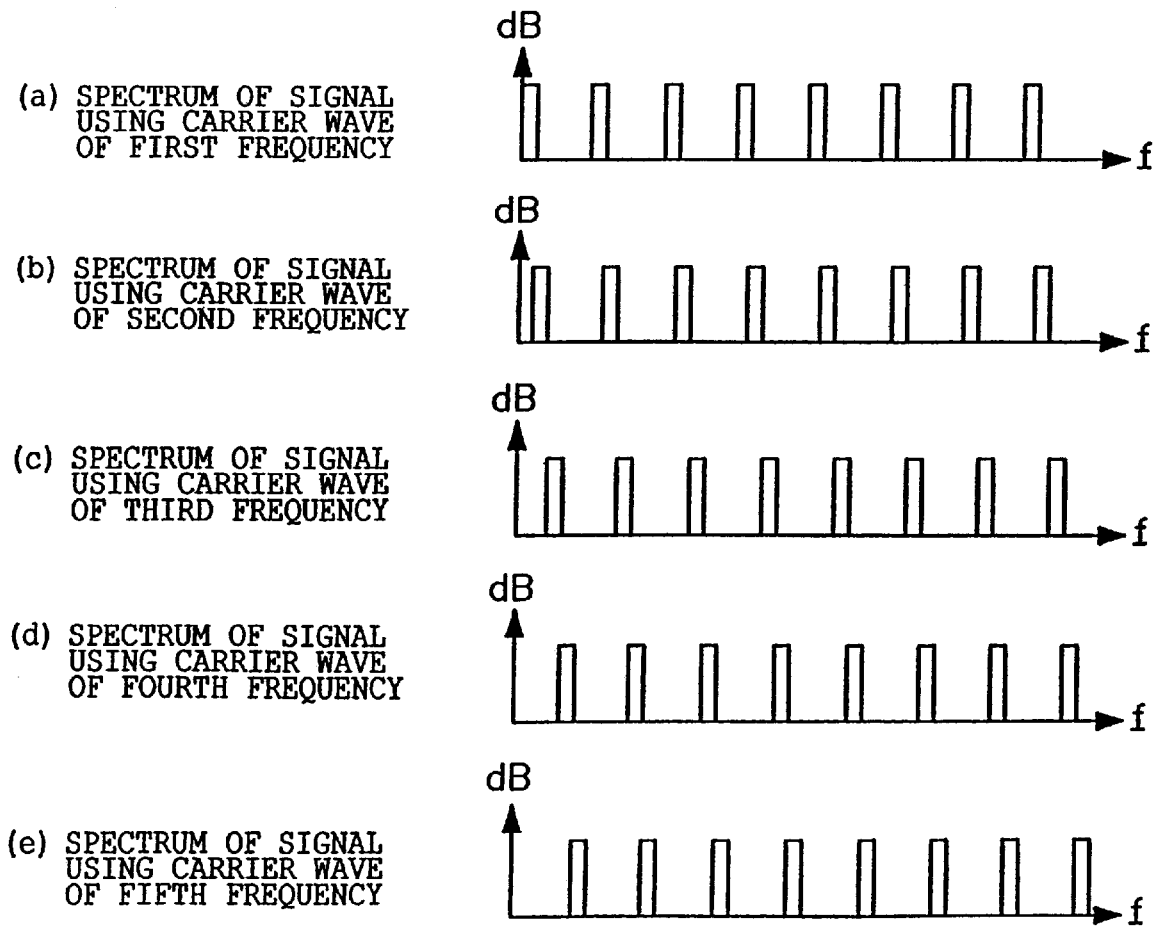
FIGS. 4(a)–4(e) show examples of the spectrum obtained when the signal shown in FIG. 3 is transmitted as a carrier wave at various frequencies.

Now, assuming that a signal $S_1$ with modulated spread spectrum exists as a signal designed by the method described above and constructed only from main pulses which do not have side lobes as shown in FIGS. 2(a) and 2(b), if a signal "$S_1 S_1 S_1 S_1 S_1$" is produced by repeating this signal $S_1$ five times, the spectrum of this signal "$S_1 S_1, S_1 S_1 S_1$" will have a comb-form shape that has a blank-portion width of "4" with respect to each spectral width of "1", as shown in FIG. 3.

In this case, as is clear from FIG. 3, if the length of the signal $S_1$ is 8, then the number of pulses will be "8"; accordingly, if this signal "$S_1 S_1 S_1 S_1 S_1$" is carried on five carrier waves of slightly different frequencies, the spectra of the respective signals will not overlap with each other as shown in FIGS. 4(a) through 4(e).

Furthermore, let the signal $S_1$ be a four-phase signal, it is easy to produce a four-phase transmission signal on the sender's side; accordingly, the construction of the transmitter 2 can be simplified, and the manufacturing cost can be reduced compared to the system using poly-phase signals.

In particular, if a four-phase signal is formed in which the respective signal phases are shifted 45 degrees each as shown by the following equation, both the real part and the imaginary part will consist of the two values Numerical formula 20

$$\left(\frac{1}{\sqrt{2}}, \frac{-1}{\sqrt{2}}\right) \tag{3}$$

so that a signal can easily be generated with the following components,

Numerical formula 21

$$\left(\frac{1+j}{\sqrt{2}}, \frac{1-j}{\sqrt{2}}, \frac{-1+j}{\sqrt{2}}, \frac{-1-j}{\sqrt{2}}\right) \tag{4}$$

Let consider another signal as expressed by the following equation.

Numerical formula 22

$$Y_{00} = \begin{bmatrix} 1 \\ j \\ 1 \\ j \\ 1 \\ j \end{bmatrix} \tag{5}$$

Figure 5:
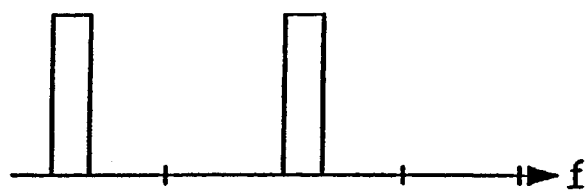
FIG. 5 shows an example of the spectrum of another basic signal used in the communication system shown in FIG. 1.

Since $Y_{00}$ is constructed by repeating a signal (1, j) with a flat spectrum three times; the resulting spectrum is as shown in FIG. 5. Furthermore, in the case of the signal expressed by the following equation:

Numerical formula 23

$$Y_{10} = \begin{bmatrix} W_{24}^0 & & & & \cdots & 0 & 0 \\ & W_{24}^4 & & & & \cdots & 0 \\ & & W_{24}^8 & & & & \\ & & & W_{24}^{12} & & & \\ 0 & \cdots & & & W_{24}^{16} & & \\ 0 & 0 & \cdots & & & & W_{24}^{20} \end{bmatrix} \begin{bmatrix} 1 \\ j \\ 1 \\ j \\ 1 \\ j \end{bmatrix} = \begin{bmatrix} W_{24}^0 \\ W_{24}^4 j \\ W_{24}^8 \\ W_{24}^{12} j \\ W_{24}^{16} \\ W_{24}^{20} j \end{bmatrix} \tag{6}$$

Figure 6:
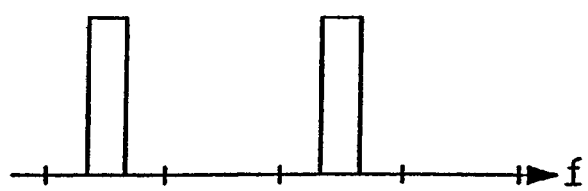
FIG. 6 shows an example of the spectrum of still another basic signal used in the communication system shown in FIG. 1.

Here, $W_{24}:W_{24}$=expt $$W_{24}:W_{24} = \exp\left(\frac{2\pi\sqrt{-1}}{24}\right)$$

the spectrum is as shown in FIG. 6.

Furthermore, if $[Y_{00}, Y_{01}, Y_{02}, Y_{03}, Y_{04}, Y_{05}, Y_{06}, Y_{07}]$ is assigned to one user where each component signal is given as follows, Numerical formula 24

$$Y_{01} = \begin{bmatrix} j \\ -1 \\ j \\ -1 \\ j \\ -1 \end{bmatrix} \quad (7)$$

$$Y_{02} = \begin{bmatrix} -1 \\ -j \\ -1 \\ -j \\ -1 \\ -j \end{bmatrix} \quad (8)$$

Numerical formula 25

$$Y_{03} = \begin{bmatrix} -j \\ 1 \\ -j \\ 1 \\ -j \\ 1 \end{bmatrix} \quad (9)$$

$$Y_{04} = \begin{bmatrix} j \\ 1 \\ j \\ 1 \\ j \\ 1 \end{bmatrix} \quad (10)$$

Numerical formula 26

$$Y_{05} = \begin{bmatrix} -1 \\ j \\ -1 \\ j \\ -1 \\ j \end{bmatrix} \quad (11)$$

$$Y_{06} = \begin{bmatrix} -j \\ -1 \\ -j \\ -1 \\ -j \\ -1 \end{bmatrix} \quad (12)$$

Numerical formula 27

$$Y_{07} = \begin{bmatrix} 1 \\ -j \\ 1 \\ -j \\ 1 \\ -j \end{bmatrix} \quad (13)$$

then 3 bits of communications can be performed at one time, merely by detecting whether any of $Y_{00}$ through $Y_{07}$ has been transmitted. In this case, $Y_{00}$ through $Y_{07}$ form an ideal code word constituting a super-regular polyhedron in the communication space. Furthermore, if $[Y_{10}, Y_{11}, Y_{12}, Y_{13}, Y_{14}, Y_{15}, Y_{16}, Y_{17}]$ as produced by the following equation is assigned to another user, Numerical formula 28

$$[Y_{10}\ Y_{11}\ Y_{12}\ Y_{13}\ Y_{14}\ Y_{15}\ Y_{16}\ Y_{17}] = \begin{bmatrix} W_{24}^{0} & & & & \cdots & 0 & 0 \\ & W_{24}^{4} & & & & \cdots & 0 \\ & & W_{24}^{8} & & & & \\ & & & W_{24}^{12} & & & \\ & & & & W_{24}^{16} & & \\ 0 & \cdots & & & & W_{24}^{16} & \\ 0 & 0 & \cdots & & & & W_{24}^{20} \end{bmatrix} \quad (14)$$

$$[Y_{00}\ Y_{01}\ Y_{02}\ Y_{03}\ Y_{04}\ Y_{05}\ Y_{06}\ Y_{07}]$$

then this user can be allowed to perform communications three bits at a time in the same manner as the previous user, without causing any spectral interference with the previous user. In this case both users are using four-phase signals on respective carrier waves.

Figure 7:
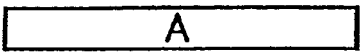
FIG. 7 is a model diagram which illustrates one example of a signal which acts as the basic signal of a pseudo-periodic signal used in the communication method shown in FIG. 1.
Figure 8:
FIG. 8 is a model diagram which illustrates an example of a pseudo-periodic signal based on the signal shown in FIG. 7.

Thus, with the use of the communication system described above and the concept of a "pseudo-periodic sequence" that is a concept wherein a basic sequence (for instance signal $S_1$) consisting of two-phase or four-phase chips is prepared, and an extended transmission frame is constructed by repeating one or a plurality of the basic sequence so as to obtain a finite length periodic sequence with a comb-form spectrum and by adding one or a plurality of chips of the back portion and front portion of the finite length periodic sequence to the outside of the front portion and outside of the back portion of the finite length periodic sequence, and at the receiver the extended transmission frame is demodulated with a matched filter matched to the finite length periodic sequence prior to extension; it is possible to realize an approximately synchronized interference-free CDMA system by creating a signal A' shown in FIG. 8 based upon the signal A of FIG. 7, and by transmitting this signal A', and then by demodulating this signal at the receiver with a matched filter matched to the signal A.

Figure 9:
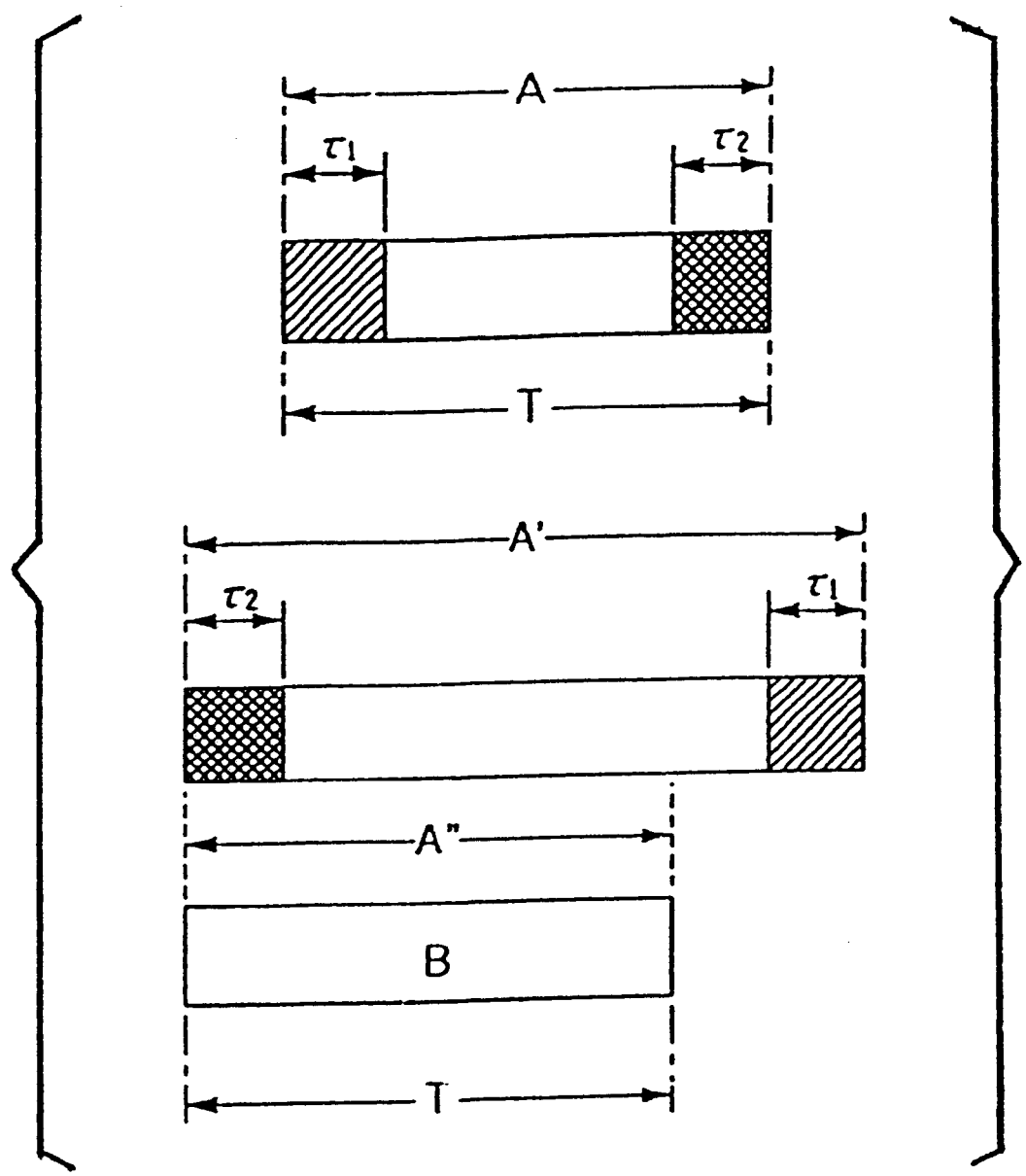
FIG. 9 is a model diagram which is used to illustrate the effect of the pseudo-periodic signal shown in FIG. 8.

In this case, for example, if a signal A' as shown in FIG. 9 is produced and transmitted by the transmitter 2, this signal A' will act as an interference signal with respect to a receiver 3 who attempts to receive signal B, e.g., a general receiving station [B] other than receiving station [A]. The phase at which the receiving station [B] receives signal A constantly fluctuates. However, as shown in FIG. 9, assuming that the phase difference between the phase of the demodulating frame of receiving station [B] and the phase of the received signal A is equal to or less than $-\tau_1$ to $+\tau_2$ seconds, and that one portion A of signal A' is matched to the phase of the despreading sequence of receiving station [B]; then, when the receiving station [B] demodulates signal A'', signal A'' is not generated as an interference component in the matched filter output of the receiving station [B], because signal A'', when viewed from the receiving station B, is a signal obtained by extracting one period of the periodic sequence of signal A and the despreading sequence B of the receiving station [B] and signal A are orthogonal each other.

Meanwhile, the receiving station [A] detects only signal A by using a matched filter matched to signal A; and even though when the station [A] receives the portion B'' of signal B with the same frame format addressed to the receiving station [B], this does not appear as the output of the matched filter matched to the periodic sequence A. In this way, an approximately synchronized interference-free CDMA system can be realized.

Thus, in this embodiment, when communications are performed between the transmitter 2 and the receiver 3 via the transmission path 4, a basic sequence consisting of two-phase or four-phase chips is prepared at the transmitter, and an extended transmission frame is constructed by repeatedly arranging one or a plurality of the basic sequence to make a finite length periodic sequence with a comb-form spectrum and by adding one or a plurality of chips of the back portion and front portion of the finite length periodic sequence to the outside of the front portion and outside of the back portion of the finite length periodic sequence, and at the receiver side the extended transmission frame is demodulated with a matched filter matched to the finite length periodic sequence prior to extension; accordingly, the construction of the communication equipment can be simplified, because a two-phase signal or four-phase signal is used, compared to cases where multi-phase signals are used, and also the manufacturing costs can be reduced.

Furthermore, in this embodiment, a transmitter produces the signal A' on the basis of signal A, which is the object of transmission, and transmits this signal, and receives, demodulates the received signal with a matched filter matched to the signal A, using the above-described communication method and the concept of a "pseudo-periodic sequence", an approximately synchronized interference-free CDMA system can be realized.

In addition, in the embodiment described above, communications are performed using the four-phase signals shown in Equation (3), etc.; however, it is also possible to perform communications using the two-phase signal shown in the following formula:

$$(1, j) \quad (15)$$

or the four-phase signals shown in the formula below, etc.

Numerical formula 29

$$\left.\begin{array}{l}(1, 1, 1, -1) \\ (1, 1, 1, 1, 1, j, -1, -j, 1, -1, 1, -1, 1, -j, -1, j) \\ (1, 1, 1, 1, 1, -j, -1, j, 1, -1, 1, -1, 1, j, -1, -j)\end{array}\right\} \quad (16)$$

Furthermore, the present inventors have published a method for producing multi-phase signals which satisfy the above-described Numerical Formula 29 in Modulatable Orthogonal Sequences and their Application to SSAM Systems (IEEE Transactions on Information Theory, Vol. IT-34, No.1, January 1988). The four-phase signals produced using this method of production are as follows:

(1) 0000012302020321
(1') 0000032102020123
(2) 0002012102000323
(2') 0002032302000121
(3) 0010013302120331
(3') 0030031102320113
(4) 0001123120213211
(4') 0003321320231233
(5) 0002123220223212
(5') 0002321220221232
(6) 0022010102200303
(6') 0022030302200101
(7) 0011302320311003
(7') 0033102120133001
(8) 0003123320233213
(8') 0001321120211231
(9) 0001012002030322
(9') 0003032002010122
(9'') 0002230302002101
(9''') 0002210102002303
(10) 0000301220201032
(10') 0000103220203012
(10'') 0000230102022103
(10''') 0000210302022301
(11) 0011013002130332
(11') 0033031002310112
(11'') 001023112122113
(11''') 0030213302322331
(12) 0001301320211033
(12') 0003103120233011
(12'') 0033011202131031
(12''') 0001103320213013

Thus, a total of 32 different types of four-phase signals can be obtained.

Here, (0, 1, 2, 3) corresponds to $(\exp(ja), \exp(j(a+\pi/2)), \exp(j(a+\pi)), \exp(j(a+3\pi/z))$. In this case, pi is $\pi$ is the ratio of the circumference of a circle to its diameter; and the above situation occurs when $a=\pi/4$.

In this case as well, the spectra of these two-phase signals or four-phase signals are flat; and therefore, an effect similar to that of the embodiment described above can be obtained.

Furthermore, in the above embodiment, a signal "$S_1S_1S_1S_1$" is produced by repeating a signal $S_1$ of an orthogonal sequence in order to realize an interference-free CDMA system. However, if the signal $S_i$ is repeated, the resulting spectrum is a comb-form spectrum, and as a result, it is also possible to produce a transmission signal by repeating a basic sequence signal other than such an orthogonal sequence.

Furthermore, in the embodiment above, each component of the comb-form spectrum takes the same amplitude by using the orthogonal sequence signal $S_1$, thus insuring desirable properties as a signal for transmission and reception. However, as a signal $S_1$, it is also possible to use a multi-phase orthogonal sequence (which is an orthogonal sequence with a certain absolute value) in stead of such an ordinary orthogonal sequence, so that the side lobes in the vicinity of the main pulses may become zero when the received signal is correlatively detected at the receiver 3.

By using such an arrangement, it is possible to facilitate the discrimination between multi-path pulses and main pulses, thus improving the anti-multi-path characteristics, even in cases where signals transmitted from the transmitter 2 are received by a receiver via a plurality of paths.

As described above, according to the present invention, in claim 1, the construction of the communication equipment can be simplified as a result of the use of two-phase signals or four-phase signals.

Furthermore, in claim 2, different carrier waves can be assigned to respective users by using two-phase signals or four-phase signals.

Furthermore, in claim 3, the occurrence of side lobes in the vicinity of the main pulses in the matched filter output at the receiver can be prevented by using two-phase signals or four-phase signals.

Furthermore, in claim 4, a plurality of code words can be created by using two-phase signals or four-phase signals.

What is claimed is:

1. A process for two-phase/four-phase modulated spread spectrum communication using a comb-form spectrum, said process comprising:

preparing a basic sequence consisting of two-phase or four-phase chips, transmitting with a transmitter an extended transmission frame which is constructed by repeatedly arranging one or a plurality of said basic sequence so as to obtain a finite length periodic sequence with a comb-form spectrum, adding a replica of one or a plurality of chips of a back portion and a front portion of said finite length periodic sequence to the outside of said front portion and outside of said back portion of said finite length period sequence, respectively, and demodulating with a receiver said extended transmission frame using a matched filter matched to said finite length period sequence prior to extension.

2. The process for two-phase/four-phase modulated spread spectrum communication according to claim 1, further compromising:

assigning different carrier waves to respective users, and assigning two-phase signals or four-phase signals so that the comb-form modulated spectrum are generated on said respective carrier waves.

3. The process for [A] two-phase/four-phase modulated spread spectrum communication according to claim 1 or 2, further comprising forming said basic sequence as a two-phase or four-phase orthogonal sequence or as a multi-phase orthogonal sequence, thereby anti-multi-path characteristics are reinforced by preventing side lobes from being generated in the vicinity of main pulses produced from said matched filter at said receiver.

4. The process for [A] two-phase/four-phase modulated spread spectrum communication according to claim 1, further comprising preparing a plurality of different types of said expanded transmission frame so as to be used as code words.

* * * * *

UNITED STATES PATENT AND TRADEMARK OFFICE
CERTIFICATE OF CORRECTION

PATENT NO.    : 6,421,367 B1
DATED         : July 16, 2002
INVENTOR(S)   : Noriyoshi Kuroyanagi et al.

It is certified that error appears in the above-identified patent and that said Letters Patent is hereby corrected as shown below:

<u>Title page,</u>
Item [86], § 371 (c)(1), (2), (4) Date:, change "Sep. 25, 1998" to -- Sep. 24, 1998 --.

Signed and Sealed this

Eleventh Day of January, 2005

JON W. DUDAS
*Director of the United States Patent and Trademark Office*